United States Patent
Collazo Gomez

(10) Patent No.: US 10,155,494 B2
(45) Date of Patent: Dec. 18, 2018

(54) CONNECTOR COMPONENT FOR SECURING AN AIRBAG MODULE TO A STEERING WHEEL, POSITIONING SLEEVE FOR THE CONNECTOR COMPONENT, SET COMPRISING SUCH A CONNECTOR COMPONENT AND A POSITIONING SLEEVE, STEERING WHEEL, AIRBAG MODULE, STEERING WHEEL ASSEMBLY, AND METHOD FOR PRODUCING SAME

(71) Applicant: Dalphi Metal Espana S.A., Vigo (ES)

(72) Inventor: Angel Collazo Gomez, Vigo (ES)

(73) Assignee: Dalphi Metal Espana S.A. (ES)

( * ) Notice: Subject to any disclaimer, the term of this patent is extended or adjusted under 35 U.S.C. 154(b) by 105 days.

(21) Appl. No.: 15/125,223

(22) PCT Filed: Mar. 13, 2015

(86) PCT No.: PCT/EP2015/000556
§ 371 (c)(1),
(2) Date: Sep. 12, 2016

(87) PCT Pub. No.: WO2015/135657
PCT Pub. Date: Sep. 17, 2015

(65) Prior Publication Data
US 2017/0174167 A1     Jun. 22, 2017

(30) Foreign Application Priority Data
Mar. 13, 2014    (DE) .................... 20 2014 002 194 U

(51) Int. Cl.
*B60R 21/203*     (2006.01)
*B60Q 5/00*     (2006.01)
*F16B 21/06*     (2006.01)

(52) U.S. Cl.
CPC .......... *B60R 21/2037* (2013.01); *B60Q 5/003* (2013.01); *F16B 21/06* (2013.01)

(58) Field of Classification Search
CPC ...... B60R 21/2037; F16B 21/06; B60Q 5/003
See application file for complete search history.

(56) References Cited

U.S. PATENT DOCUMENTS

| 5,350,190 A | 9/1994 | Szigethy |
| 6,422,594 B2 * | 7/2002 | Hasebe .................. B60Q 5/003 200/61.55 |

(Continued)

FOREIGN PATENT DOCUMENTS

| DE | 1948618 | 9/1969 |
| DE | 102008023004 A1 * | 11/2009 ............. B60Q 5/003 |

(Continued)

OTHER PUBLICATIONS

Hondier et al., Alarm activating device for fly-wheel of motor vehicle, has movable element touching electrical contact with closed current circuit in activation position, where movable element is in form of electrical contact to which tension is applied, Nov. 12, 2009, EPO, DE 102008023004 A1, English Abstract.*

(Continued)

*Primary Examiner* — James A English
(74) *Attorney, Agent, or Firm* — Tarolli, Sundheim, Covell & Tummino LLP

(57) ABSTRACT

A connector component (1) for fastening an airbag module (50) to a steering wheel (40) includes a steering wheel-side part (10) and a module-side part (20) movable relative to each other and biased against each other so that the module-side part is spaced apart from the steering wheel-side part in an idle position and is movable into a hooting position in which the module-side part contacts the steering wheel-side part. The module-side part (20) and the steering wheel-side part (10) are interconnected and form a multifunctional (Continued)

component including a guiding device for guided movement of the module-side part from the idle position into the hooting position and electric contacts for an electric horn circuit that contact each other in the hooting position. The invention also relates to a connector component and a positioning sleeve, a steering wheel, an airbag module, a steering wheel assembly and a manufacturing method.

19 Claims, 6 Drawing Sheets

(56) References Cited

U.S. PATENT DOCUMENTS

| | | | |
|---|---|---|---|
| 2001/0035631 A1 | 11/2001 | Hasebe | |
| 2003/0151237 A1 | 8/2003 | Xu et al. | |
| 2003/0197355 A1* | 10/2003 | Bohn | B60Q 5/003 |
| | | | 280/731 |
| 2006/0208470 A1* | 9/2006 | Tsujimoto | B60Q 5/003 |
| | | | 280/731 |
| 2012/0242064 A1* | 9/2012 | Weigand | B60Q 5/003 |
| | | | 280/728.2 |
| 2012/0305371 A1* | 12/2012 | Chevalier | B60Q 5/003 |
| | | | 200/61.54 |
| 2014/0203539 A1 | 7/2014 | Bachmann et al. | |
| 2015/0258933 A1* | 9/2015 | Celada Yebenes | |
| | | | B60R 21/2037 |
| | | | 200/61.54 |

FOREIGN PATENT DOCUMENTS

| | | |
|---|---|---|
| EP | 1772314 | 4/2007 |
| EP | 102008023004 | 11/2009 |
| WO | 2011101066 | 8/2011 |

OTHER PUBLICATIONS

Hondier et al.,Alarm activating device for fly-wheel of motor vehicle, has movable element touching electrical contact with closed current circuit in activation position, where movable element is in form of electrical contact to which tension is applied, Nov. 12, 2009, EPO, DE 102008023004 A1, Machine Translation.*

* cited by examiner

CONNECTOR COMPONENT FOR SECURING AN AIRBAG MODULE TO A STEERING WHEEL, POSITIONING SLEEVE FOR THE CONNECTOR COMPONENT, SET COMPRISING SUCH A CONNECTOR COMPONENT AND A POSITIONING SLEEVE, STEERING WHEEL, AIRBAG MODULE, STEERING WHEEL ASSEMBLY, AND METHOD FOR PRODUCING SAME

RELATED APPLICATIONS

This application corresponds to PCT/EP2015/000556, filed Mar. 13, 2015, which claims the benefit of German Application No. 20 2014 002 194.5, filed Mar. 13, 2014, the subject matter of which are incorporated herein by reference in their entirety.

BACKGROUND OF THE INVENTION

The invention relates to a connector component for fastening an airbag module to a steering wheel according to the preamble of claim 1. Such connector component is known, for example, from DE 10 2012 002 722 A1.

The known connector component comprises plural individual components in the form of bearing parts. The bearing parts form, on the one hand, a steering wheel-side part and, on the other hand, a module-side part. The steering wheel-side part is directly coupled to the steering wheel armature and can be exactly aligned vis-à-vis the steering wheel armature. The module-side part is connected to the airbag module and can be exactly aligned vis-à-vis the airbag module. The module-side part and the steering wheel-side part are biased against each other in a marked state so that in an idle position of the module-side part the airbag module is arranged to be spaced apart from the steering wheel armature. The airbag module is movable against the biasing force toward the steering wheel armature, the module-side part and the steering wheel-side part of the connector component abutting against each other.

It is known from practice to arrange horn contacts separately from the connector component on the one hand on the airbag module and on the other hand on the steering wheel. The horn contacts contact each other when the airbag module is in the hooting position. In this way an electric horn circuit can be closed, whereupon the signal horn of a vehicle is blown.

In manufacturing steering wheel assemblies especially the requirements to the tolerance as regards the clearance between the airbag module and the steering wheel constitute a problem. The steering wheel armature is usually provided with steering wheel foam cover afflicted with relatively large tolerances. Therefore, among plural steering wheel assemblies of one production unit there are differences in the clearance between the airbag module and the steering wheel. For compensating such differences it is required to align each individual steering wheel assembly separately so that the desired tolerances frequently intended to amount to less than 0.5 mm or even less than 0.1 mm are reached. This entails considerable additional costs in the production of steering wheel assemblies.

Furthermore, the costs for integrating a horn function in the steering wheel assembly are comparatively high, as the horn contacts are arranged separately at the steering wheel and at the airbag module, respectively. As a consequence, it is necessary for each type of steering wheel, for instance for different car manufacturers, to individually design and arrange the connector component and the horn contacts.

SUMMARY OF THE INVENTION

It is the object of the invention to describe a connector component for fastening an airbag module to a steering wheel which can be used universally as a compact component for different combinations of airbag modules and steering wheels and in particular combines a guiding function for the airbag module and a hooting function. Furthermore, it is an object of the invention to describe a positioning sleeve for connection to the connector component, a set including the connector component and the positioning sleeve as well as a use of the connector component or of the set. Moreover, it is the object of the invention to describe a steering wheel comprising said connector component, an airbag module comprising an afore-mentioned positioning sleeve, a steering wheel assembly comprising a steering wheel and an airbag as well as a manufacturing method.

In accordance with the invention, this object is achieved with respect to the claimed connector component, with respect to the claimed positioning sleeve, with respect to the claimed steering wheel, with respect to the claimed airbag module, and with respect to the claimed steering wheel assembly.

The invention is based on the idea to describe a connector component for fastening an airbag module to a steering wheel having a steering wheel-side part and a module-side part. The steering wheel-side part and the module-side part are movable relative to each other and are biased against each other so that the module-side part is distant from a steering wheel-side part in an idle position and is movable into a hooting position in which the module-side part contacts the steering wheel-side part. According to the invention, the module-side part and the steering wheel-side part are interconnected and form a multifunctional component. The multifunctional component includes a guiding device for a guided movement of the module-side part from the idle position into the hooting position. Furthermore, the multifunctional component includes electric contacts for an electric horn circuit, the electric contacts contacting each other in the hooting position.

Since the module-side part and the steering wheel-side part are interconnected and form a multifunctional component, the connector component is easy to handle as a whole. Concretely speaking, the connector component forms a compact self-contained assembly. Simultaneously the connector component combines both a guiding function for moving the airbag module from the idle position into the hooting position and a hooting function by the electric contacts integrated in the connector component. Due to the compact design, the connector component therefore is suitable for connecting different airbag modules to different steering wheels. In other words, the connector component can be used universally and in this way contributes to a reduction of costs in the production of steering wheel assemblies.

In a preferred embodiment of the invention, the steering wheel side part includes an anchoring element for fixation in a steering wheel foam coating. As explained already, in previous solutions for connecting an airbag module to a steering wheel it has been difficult to keep the tolerance chain as small as possible so as to maintain the size of the horn clearance within the predetermined tolerance range. Due to inaccuracies in the foam coating of a steering wheel, individual steering wheels vary as to their dimensions so that in previous solutions it has been necessary to align each individual steering wheel assembly in a costly manner. As in the connector component according to the invention in a preferred variant an anchoring element is provided which is suited for fixation in the foam coating of the steering wheel itself, inaccuracies in the foam coating of the steering wheel are not transmitted to the connector component. Rather, the connector component can be aligned already directly in the foam coating of the steering wheel so that the tolerance chain is reduced on the whole. This entails higher accuracy in adjusting the horn clearance so that individual alignment of the individual steering wheel assemblies is avoided.

In another preferred variant of the present invention the electric contacts for the electric horn circuit have a first horn contact and a second horn contact, the first horn contact being arranged at the steering wheel-side part and the second horn contact being arranged at the module-side part.

It can be further provided in the invention that the guiding device includes a positioning pin formed integrally with the steering wheel-side part and extending through the module-side part. This, too, reduces the tolerance chain, as the airbag module can be aligned immediately by the positioning pin which can be integrally fixed in the steering wheel foam coating via the steering wheel-side part. In this way an expensive design including plural bearing bushes provided for individual alignment of each individual steering wheel is avoided. Rather, a further fault tolerance source is avoided by forming the positioning pin integrally with the steering wheel-side part so that the connector component in total has a compact design.

The positioning pin can have a cross profile, wherein a profile width of the cross profile is larger than a profile depth of the cross profile. Within the scope of the application, a cross profile is considered to be a profile that is cross-shaped in cross-section with two bars crossing at an angle of 90°. A first bar forms the profile width of the cross profile and is larger than a second bar determining the profile depth of the cross profile. The designation of the bars in the present case only serves for illustrating the appearance of the cross profile. In fact, the cross profile preferably is an extruded profile so that no bars separated from each other are evident. The use of a cross profile on the one hand permits a mobile design of the positioning pin and on the other hand forms the basis of a good guiding property of the positioning pin. Over-determination is avoided in that the profile width is larger than the profile depth of the cross profile. When using a corresponding positioning sleeve at least the profile width serves for play-free guiding of the positioning sleeve. In the direction of the positioning height the positioning sleeve has play so that additional alignment can be performed. On the other hand, by twisted arrangement of plural connector components on a steering wheel exact positioning can be performed, because the airbag module has merely two degrees of freedom vis-à-vis the steering wheel.

The positioning pin preferably extends through a biasing means arranged in a tensioning means seat of the steering wheel-side part. The biasing means can be a coil spring, for instance, which is in the form of a compression spring and is arranged in a spring seat of the steering wheel-side part. By utilizing the space available inside the coil spring for arranging the positioning pin a compact design of the connector component is obtained.

In another preferred embodiment of the connector component according to the invention, the module-side part includes at least one, especially two snap hooks for positive fixation at the airbag module. The use of snap hooks for fixation at the airbag module facilitates manufacture of a steering wheel assembly, because the airbag module merely has to be engaged in the connector component. On the whole, in this way the efficiency of the manufacturing process is increased.

The electric contacts, especially the first and second horn contacts, advantageously can be arranged between side walls of the module-side part. The side walls can form a protection for the electric contacts so that the electric contacts can be prevented from being soiled. Thus the electric contacts are exposed to less wear which increases the reliability of the hooting function of the connector component.

The side walls of the module-side part can be part of the guiding device or can be associated with the guiding device. In other words, the guiding device can comprise the side walls of the module-side part, wherein the side walls at least partially overlap or encompass the steering wheel-side part in the idle position so that the steering wheel-side part is guided between the side walls. The side walls of the module-side part in this respect can carry out a double function. On the one hand, the side walls are adapted to protect the electric contacts arranged there between against impurities. Such protection already exists in the idle position of the module-side part, because the side walls partially overlap or encompass the steering wheel-side part. On the other hand, the side walls can contribute to the guiding function of the connector component in that the steering wheel-side part is guided between the side walls. Hence the side walls are preferably adjacent to the steering wheel-side part free from play so as to guide a linear movement of the module-side part vis-à-vis the steering wheel-side part.

In order to connect the module-side part to the steering wheel-side part of the uniform component or the multifunctional components preferably a snap connection is provided. Concretely speaking, the module-side part and the steering wheel-side part can be connected by snap-fit. The steering wheel-side part can have snap hooks engaging in snap recesses of the module-side part, especially of the side walls of the module-side part. As an alternative, it is also possible that the steering wheel-side part includes snap recesses and the module-side part includes snap hooks. Finally configurations are imaginable in which both at the steering wheel-side part and at the module-side part snap hooks and snap recesses corresponding to each other are arranged. It may be generally provided that the snap recesses have a depth corresponding to the distance of the module-side part from the steering wheel-side part in the idle position. This ensures that the snap hook engages in the snap recess over the entire shift height of the module-side part.

Within the scope of a coordinate aspect, the invention is based on the idea to indicate a positioning sleeve adapted to be fixedly connected to an airbag module or adapted to be integrated in an airbag module in one piece. The positioning sleeve has an inner contour that is shaped and/or dimensioned for the at least partially tolerance-free engagement of the positioning pin of the afore-described connector component. The positioning sleeve substantially forms a component corresponding to the connector component, especially to the module-side part of the connector component. The positioning sleeve can include engaging apertures in which the snap hooks of the connector component engage for positively connecting the connector component to the positioning sleeve. The positioning sleeve can form a separate component adapted to be connected to an airbag module. It is also possible that the positioning sleeve is formed integrally with the airbag module.

In any case, it is provided of preference that the positioning sleeve has an inner contour interacting with the positioning pin of the connector component so that the airbag module is aligned vis-à-vis the steering wheel within exact tolerances during assembly.

Another aspect of the present invention relates to a set comprising an afore-described connector component and an afore-described positioning sleeve. The set according to the invention is suited for connecting different airbag modules to different steering wheels. In this respect, the set can be universally used for different steering wheel assemblies.

The invention also relates to the use of a connector component or a set of a connector component and a positioning sleeve for connecting different steering wheels to different airbag modules.

The connector component described in detail may be integrated in a steering wheel. In this respect, the invention deals with a steering wheel including such connector component. In a preferred configuration the steering wheel may have a steering wheel armature and a steering wheel foam coating, wherein the steering wheel-side part of the connector component, especially an anchoring element of the steering wheel-side part, is embedded at least partially in the steering wheel foam coating. As already illustrated before, the embedding of the steering wheel-side part in the steering wheel foam coating reduces the tolerance chain so that a horn clearance between the airbag module and the steering wheel can be set with exact tolerances.

According to another aspect according to the invention, within the scope of the present application an airbag module comprising a positioning sleeve is disclosed and claimed. The airbag module can especially have at least two positioning sleeves which are arranged to be twisted relative to each other by 90°. The twisted arrangement of at least two positioning sleeves at an angle of 90° permits exact positioning and alignment of the airbag module in a steering wheel, because usually only two degrees of freedom exist between the airbag module and the steering wheel. Consequently, two positioning sleeves are sufficient for exactly aligning the airbag module in the steering wheel.

The present invention also relates to a steering wheel assembly comprising an afore-mentioned steering wheel and an afore-described airbag module. It may be provided in a preferred embodiment that the airbag module includes at least two, especially three positioning sleeves that are positively connected to at least two, especially three connector components fixed to the steering wheel. The connector components fixed to the steering wheel can be embedded in a steering wheel foam coating of the steering wheel especially by means of their anchoring elements. The positioning sleeves can be fixedly connected to the airbag module or formed integrally with the airbag module. Preferably both the positioning sleeves and the connector components are arranged to be offset by 90° relative to each other at the airbag module and at the steering wheel, resp., so that the airbag module is connected to the steering wheel within exact tolerances.

Finally, within the scope of the application a method of manufacturing a steering wheel assembly, especially an afore-described steering wheel assembly, is disclosed and claimed, the method comprising the following steps of:
providing a steering wheel armature;
foam coating the steering wheel armature for forming a steering wheel comprising a steering wheel foam coating;
fixing at least two connector components in the steering wheel foam coating;
providing an airbag module including at least two positioning sleeves;
and
connecting the positioning sleeves by snap-fit to module-side parts of the connector components for fixation of the airbag modules at the steering wheel.

The method according to the invention excels by simple handling so that the production process for steering wheel assemblies is facilitated and accelerated.

BRIEF DESCRIPTION OF THE DRAWINGS

Hereinafter the invention shall be illustrated in detail by way of embodiment with reference to the enclosed schematic drawings, in which.

DESCRIPTION

Figure 1:
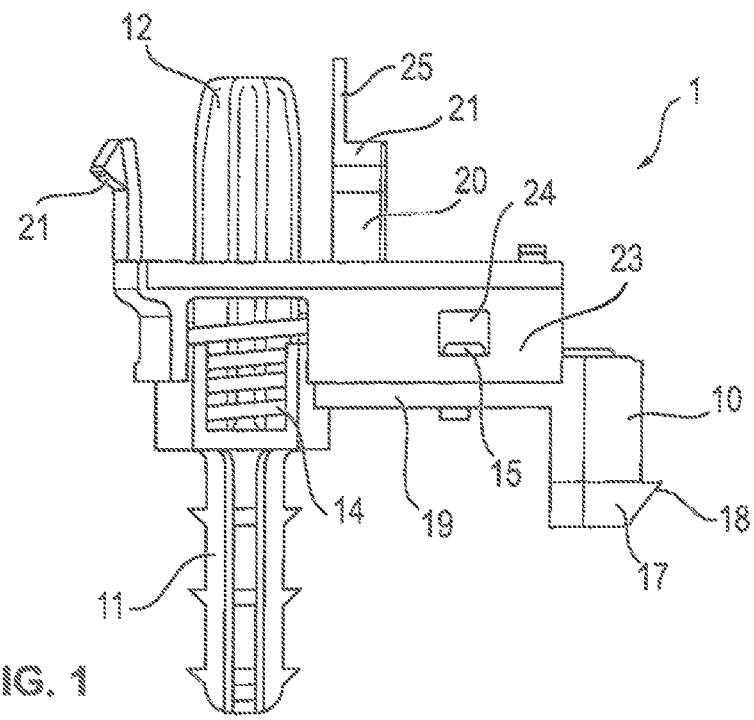
FIG. 1 shows a side view of a connector component according to the invention in accordance with a preferred embodiment.

In the figures a connector component 1 for fastening an airbag module 50 to a steering wheel 40 is shown. The connector component 1 includes a steering wheel-side part 10 and a module-side part 20. The steering wheel-side part 10 and the module-side part 20 are movable relative to each other. In particular, the steering wheel-side part 10 and the module-side part 20 are biased against each other. A biasing means 14, preferably in the form of a coil spring, is arranged between the module-side part 20 and the steering wheel-side part 10. The biasing means 14 or the coil spring, resp., is a compression spring so that the module-side part is arranged in an idle position to be spaced apart from the steering wheel-side part. The module-side part 20 is movable into a hooting position in which the module-side part 20 contacts the steering wheel-side part 10.

The steering wheel-side part 10 and the module-side part 20 are generally interconnected so that the connector component in total forms a uniform, preferably compact component. In other words, the connector component can be uniformly handled and constitutes a single or separate component part of a higher assembly group. The connector component especially constitutes a multifunctional component comprising a guiding device and electric contacts for an electric horn circuit. The guiding device permits a guided movement of the module-side part 20 from the idle position into the hooting position. The electric contacts are suited for closing an electric horn circuit, wherein the electric contacts contact each other in the hooting position of the module-side part 20.

Advantageously the connector component 1 combines two functions in one single multifunctional component. On the one hand, the connector component adopts a guiding function for the horn actuation, wherein the module-side part 20 is approached to the steering wheel-side part 10 in a guided shift motion. At the same time, the hooting function is integrated in the connector component. In this way two functions can be simultaneously integrated in a steering wheel assembly by one single component, i.e. the connector component 1 according to the invention.

The steering wheel-side part 10 includes an anchoring element 11, the latter having plural barbed hook-like locking teeth. Furthermore, at the steering wheel-side part 10 a retaining attachment 17 is provided which is spaced apart from the anchoring element 11 and comprises a projection 18. The anchoring element 11 and the retaining attachment 17 serve for fixing the steering wheel-side part 10 in a steering wheel foam coating 41 of a steering wheel 40. With the aid of the barbed hook-like locking teeth at the anchoring element 11 and the projection 18 at the retaining attachment 17 the steering wheel-side part 10 is tightly fixed in the steering wheel foam coating 41. The anchoring element 11 and the retaining attachment 17 are interconnected by a land 19. The land 19 comprises snap hooks 15 engaging in snap recesses 24 of the module-side part 20 for connecting the steering wheel-side part 10 to the module-side part 20.

Further, between the anchoring element 11 and the land 19 a tensioning means seat 13 is provided in which the biasing means 14 is supported. The tensioning means seat is substantially cup-shaped. The tensioning means seat 13 and the anchoring element 11 are aligned especially coaxially with each other.

In axial continuation of the anchoring element 11 furthermore a positioning pin 12 is arranged in the tensioning means seat 13. The positioning pin 12 is aligned with the anchoring element 11 and extends through the biasing means 14. Moreover, the positioning pin 12 reaches through the module-side part 20, wherein the latter includes a respective penetration aperture 22. The positioning pin 12 extends through the penetration aperture 22 of the module-side part 20.

Figure 5:
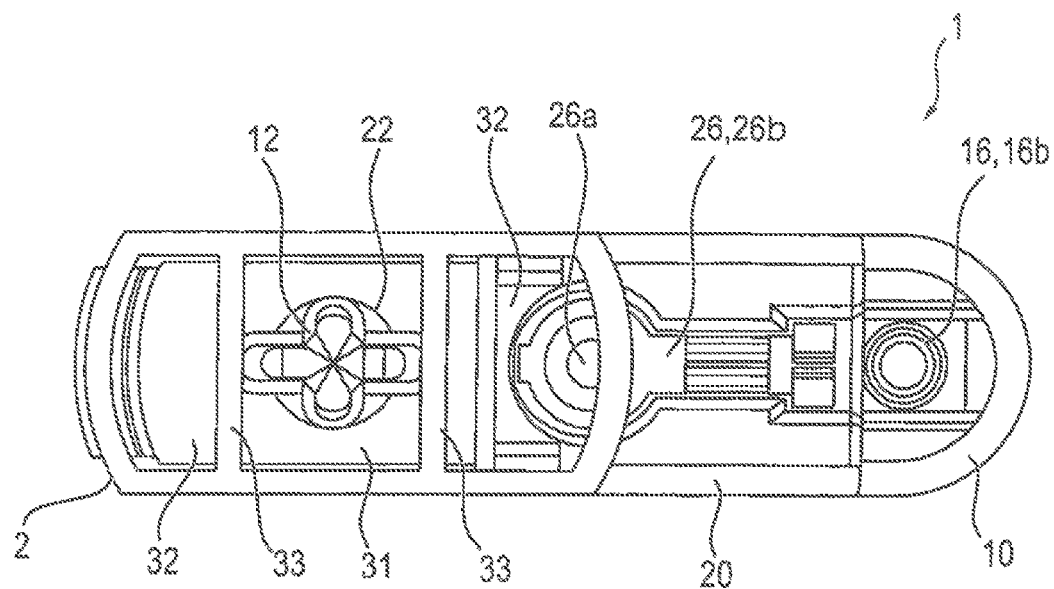
FIG. 5 shows a top view of the connector component according to FIG. 1, wherein a positioning sleeve is coupled to the connector component.

The positioning part 12 is formed integrally with the steering wheel-side part 10 and includes a cross profile clearly visible in FIG. 5. The cross profile comprises a profile width and a profile depth, the profile width extending in parallel to the land 19 of the steering wheel-side part 10. The profile depth extends at right angles to the profile width. The profile width is larger than the profile depth of the cross profile. In particular, the profile width is adapted so that the positioning pin 12 can engage between two partition walls 33 of a positioning sleeve 2 free from play. For easy handling when inserting the positioning pin 12 into a positioning sleeve 2, the positioning pin 12 is formed to be tapered at its free end. In other words, the profile width and/or the profile depth of the cross profile are reduced in the direction of a free end of the positioning pin 12. This facilitates joining the connector component 1 to the positioning sleeve 2, with the positioning pin 12 adopting a guiding function.

Figure 4:
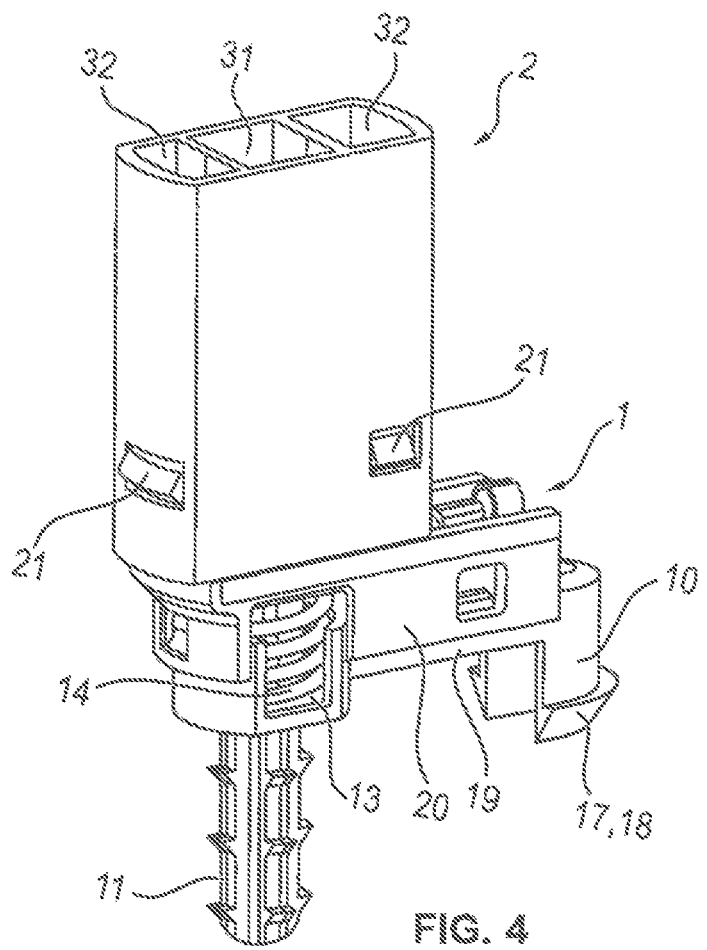
FIG. 4 shows a perspective view of the connector component comprising a positioning sleeve according to FIG. 2.

The module-side part 20 includes snap hooks 21 extending substantially in parallel to the positioning pin 12. The snap hooks 21 include outwardly facing detents. The snap hooks 21 interact with engaging apertures 34 of the positioning sleeve 2 for connection with a positioning sleeve 2. In this way, a positive connection between the positioning sleeve 2 and the connector component 1 is resulting, as is shown in FIGS. 2 and 4.

A centering plate 25 extending in parallel to the profile depth of the positioning pin 12 is further formed on at least one snap hook 21. The centering plate 25 includes a substantially triangular contour with a triangular point facing away from the land 19 of the steering wheel-side part 10. The centering plate 25 can engage in the positioning sleeve 2, especially an outer chamber 32 of the positioning sleeve 2 when joining with a positioning sleeve 2 and can back the guiding of the joining movement between the positioning sleeve 2 and the connector components 1.

The module-side part 20 further comprises side walls 23 extending in parallel to each other and having snap recesses 24. The snap recesses 24 receive the snap hooks 15 of the steering wheel-side part 10. The depth of the snap recesses 24 is dimensioned so that a movement of the module-side part 20 relative to the steering wheel-side part 10 is enabled, wherein the snap hooks 15 are engaged in the snap recesses 24 both in the idle position of the module-side part 20 and in the hooting position of the module-side part 20. The land 19 of the steering wheel-side part 10 is guided between the side walls 23 of the module-side part 20. In other words, the side walls 23 of the module-side part 20 overlap the steering wheel-side part 10, especially the land 19, both in the idle position and in the hooting position. In this way the electric contacts for the hooting function arranged between the side walls 23 are protected against impurities.

Figure 2:
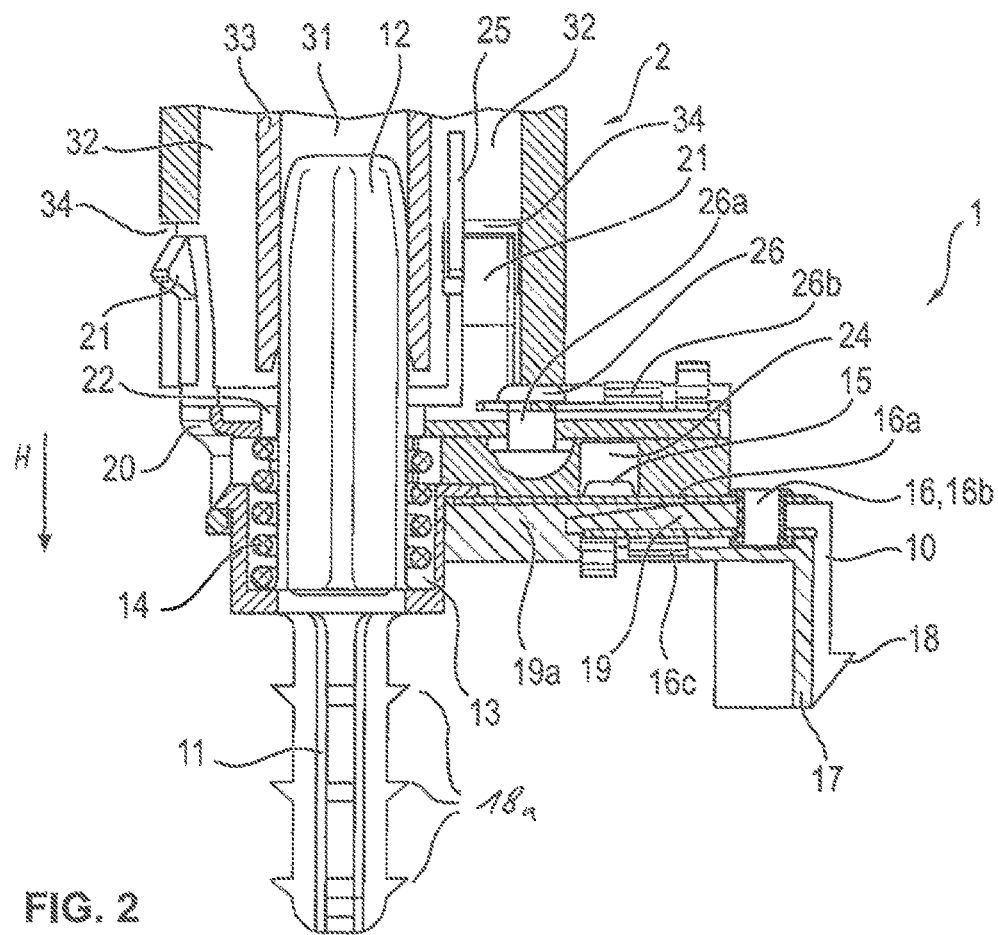
FIG. 2 shows a sectional view of the connector component according to FIG. 1, wherein the connector component is coupled to a positioning sleeve.

The arrangement of the electric contacts for the hooting function is clearly visible in FIG. 2. The electric contacts comprise a first horn contact 16 disposed at the steering wheel-side part 10. The first horn contact 16 is substantially formed as deflectable plate disposed to rest on the land 19 between the module-side part 20 and the steering wheel-side part 10. The flexible plate 16a is connected by a penetration contact 16b to a first terminal 16c arranged on an underside of the land 19. The land 19 moreover includes a deflecting aperture 19a so that the contact plate 16a is deflectable under pressure.

A second horn contact 26 is disposed at the module-side part 20, wherein the second horn contact 26 includes a contact rivet 26a reaching through the module-side part 20 and having a dome-shaped or lens-shaped head between the module-side part 20 and the steering wheel-side part 10. The contact rivet 26a is connected to a second terminal 26b disposed on an upper side of the module-side part 20. It is clearly evident from FIG. 2 that in the hooting position the contact rivet 26a contacts and possibly deflects the contact plate 16a of the first horn contact 16. When the two horn contacts 16, 26 are in contact, an electric horn circuit is closed so that the signal horn of a vehicle is blown.

Figure 3:
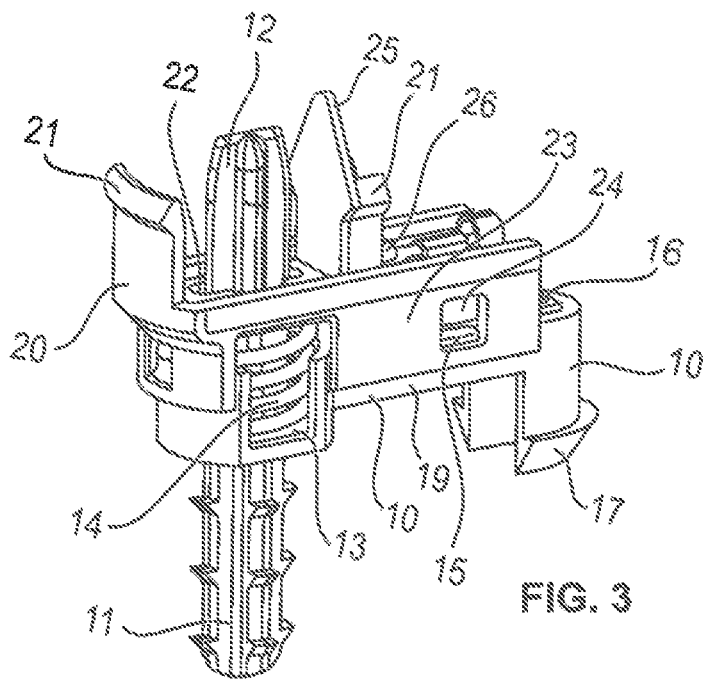
FIG. 3 shows a perspective view of the connector component according to FIG. 1.

The connector component 1 illustrated in FIGS. 1 and 3 preferably interacts with a positioning sleeve 2 which is shown in FIGS. 2, 4 and 5. The positioning sleeve 2 comprises an inner chamber 31 and two outer chambers 32 separated from the inner chamber 31 by partition walls 33. Furthermore, the positioning sleeve 2 includes engaging apertures 34 disposed so that the positioning sleeve 2 can be positively coupled to the connector component 1. As is clearly evident from FIGS. 2 and 5, the positioning pin 12 engages in the inner chamber 31 of the positioning sleeve 2, wherein the positioning pin 12 is adjacent to the partition walls 33 of the positioning sleeve 2 free from play at least regarding the profile width of the cross profile. It is further visible in FIG. 5 that the centering plate 25 is disposed in an inner chamber 31 of the positioning sleeve 2 equally free from play. Due to the tapered positioning pin 12 and the tapered centering plate 25 easy joining of the positioning sleeve 25 and the connector component 1 is achieved. In this respect, the positioning pin 12 and the centering plate 25 constitute component parts of a guiding device for guided joining of the positioning sleeve 2 to the connector component 1.

Another guiding device which serves for the guided movement of the module-side part 20 from the idle position into the hooting position is formed especially by the side walls 23 encompassing the land 19 and the penetration aperture 22 which is adapted to the profile contour of the positioning pin 12. In other words, the module-side part 20 and the steering wheel-side part 10 are matched as to shape and dimension such that a guided, especially linear movement is provided from the idle position, in which the module-side part 20 and the steering wheel-side part 10 are spaced apart from each other so that the electric horn circuit is opened, into the hooting position, in which the module-side part 20 and the steering wheel-side part 10, especially the horn contacts 16, 26, are in contact so as to close the electric horn circuit. The tolerances between the module-side part 20 and the steering wheel-side part 10 are preferably adapted so that a transverse displacement of the module-side part 20 relative to the steering wheel-side part 10 is largely excluded. This ensures that the horn clearance between the airbag module 50 and the steering wheel 40 remains substantially constant, at least in the idle position.

Figure 6:
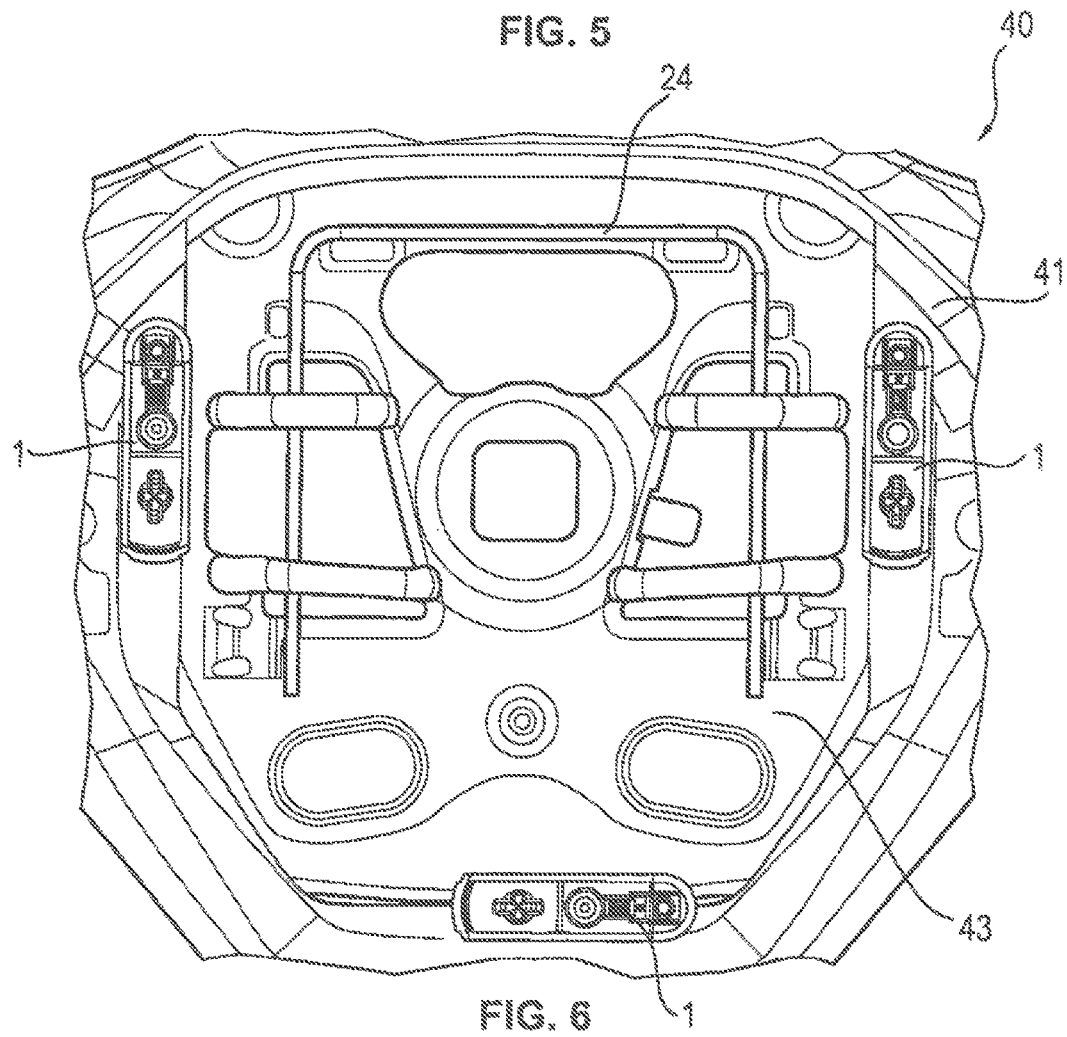
FIG. 6 shows a top view of a module acceptance of a steering wheel including connector components disposed therein.
Figure 7:
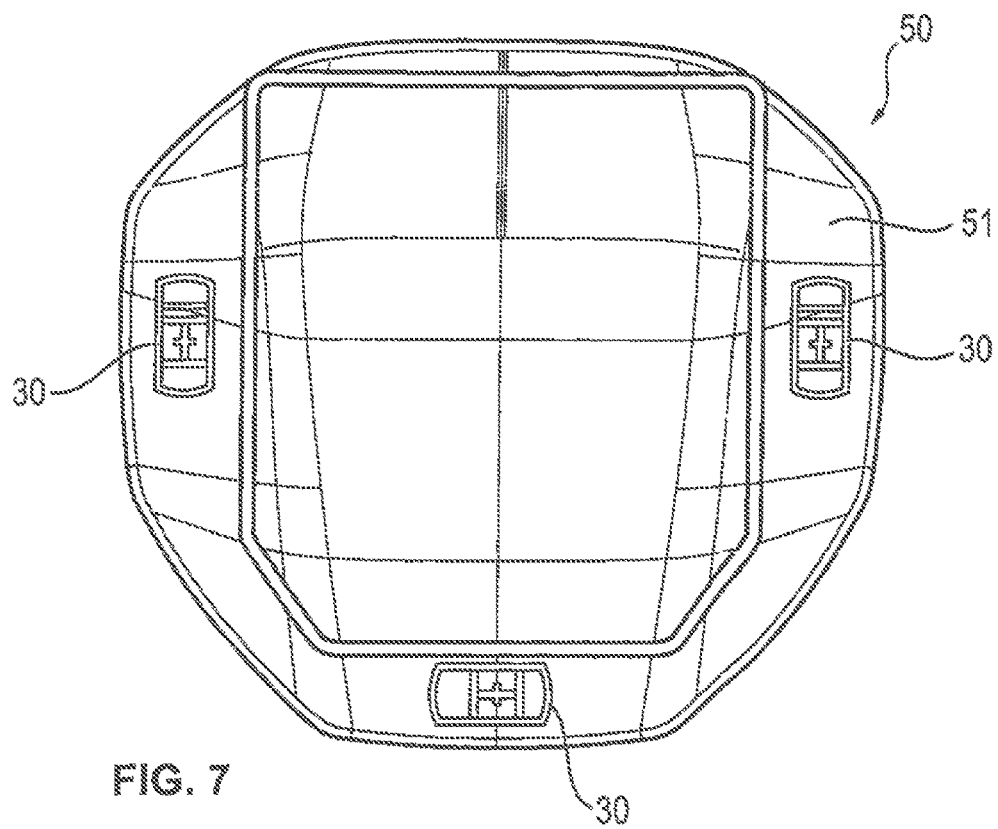
FIG. 7 shows a top view of an airbag module comprising three positioning sleeves that are arranged partially twisted relative to each other.

FIG. 6 illustrates a cutout of a steering wheel 40, especially a module acceptance in a central area of the steering wheel 40. In the shown embodiments the steering wheel 40 is equipped with three connector components 1, two connector components 1 being aligned in parallel to each other. A third connector component 1 is arranged to be twisted by 90° with respect to the two further connector components 1. In this manner, a clear alignment of an airbag module 50 in the steering wheel 40 is achieved, as the profile width of the respective positioning pin 12 ensures true-to-size joining of the airbag module 50. Each of the connector components 1 is embedded in a steering wheel foam coating 41 or anchored in a steering wheel foam coating 41. The steering wheel foam coating 41 has a recess in the area of the module acceptance for the airbag module 50 so that the steering wheel armature 43 is visible between the connector components 1. A retaining bracket 42 locking with corresponding fastening hooks 52 of the airbag module 50 and in this way tightly connecting the airbag module 50 to the steering wheel armature 43 is connected to the steering wheel armature 43. FIG. 7 illustrates an airbag module 50 having a cover 51, wherein the cover 51 is connected to positioning sleeves 30. According to the embodiment described in the following, the positioning sleeves 2 shown in FIG. 2 to 6 are identical to positioning sleeves 30 shown in FIGS. 7 and 8. The spatial arrangement of the positioning sleeves 30 is also clearly visible in FIG. 8. The positioning sleeves 30 can be tightly connected to the airbag module 50, especially to the cover 51. It is also possible to design the positioning sleeves 30 integrally with the cover 51 and generally with the airbag module 50, respectively. The airbag module 50 comprises the fastening hooks 52 interacting with the retaining bracket 42 for fixing the airbag module 50 to the steering wheel armature 43.

For manufacturing a steering wheel assembly comprising the steering wheel 40 and the airbag module 50 it is provided to fabricate the steering wheel 40 first by foam-coating a steering wheel armature 43 with a steering wheel foam coating 41. After that, the connector components 1 are impressed into the steering wheel foam coating 41, wherein the steering wheel-side part 10, especially the anchoring element 11 and the retaining attachment 17, are locked with the steering wheel foam coating 41. The connector components 1 are exactly aligned with respect to the steering wheel 40. Since the connector components 1 are arranged directly in the steering wheel foam coating 41, a further additional aligning operation is no longer required.

Finally the airbag module 50 equipped with the positioning sleeves 30 is attached to the steering wheel 40, wherein the joining movement between the positioning sleeve 30 and the connector component 1 is guided by the positioning pin 12 and the centering plate 25. By exerting corresponding pressure on the airbag module 50 the positioning sleeves 30 are locked with the connector component 1. Especially the snap hooks 21 of the module-side part 20 engage in the engaging apertures 34 of the positioning sleeves 30. At the same time, the retaining bracket 42 engages in the fastening hooks 52 of the airbag module 50 so that the airbag module 50 is tightly connected to the steering wheel 40.

Since, upon locking the positioning sleeve 30, the module-side part 20 is simultaneously pressed against the spring force of the biasing module 14 in the direction of the steering wheel-side part 10, i.e. takes the hooting position, already upon joining the airbag module 50 and the steering wheel 40 a functional check of the horn contacts 16, 26 can be carried out. Altogether, thus the individual steps for manufacturing steering wheel assemblies are reduced, which has a positive effect on the series production of steering wheel assemblies.

Figure 9:
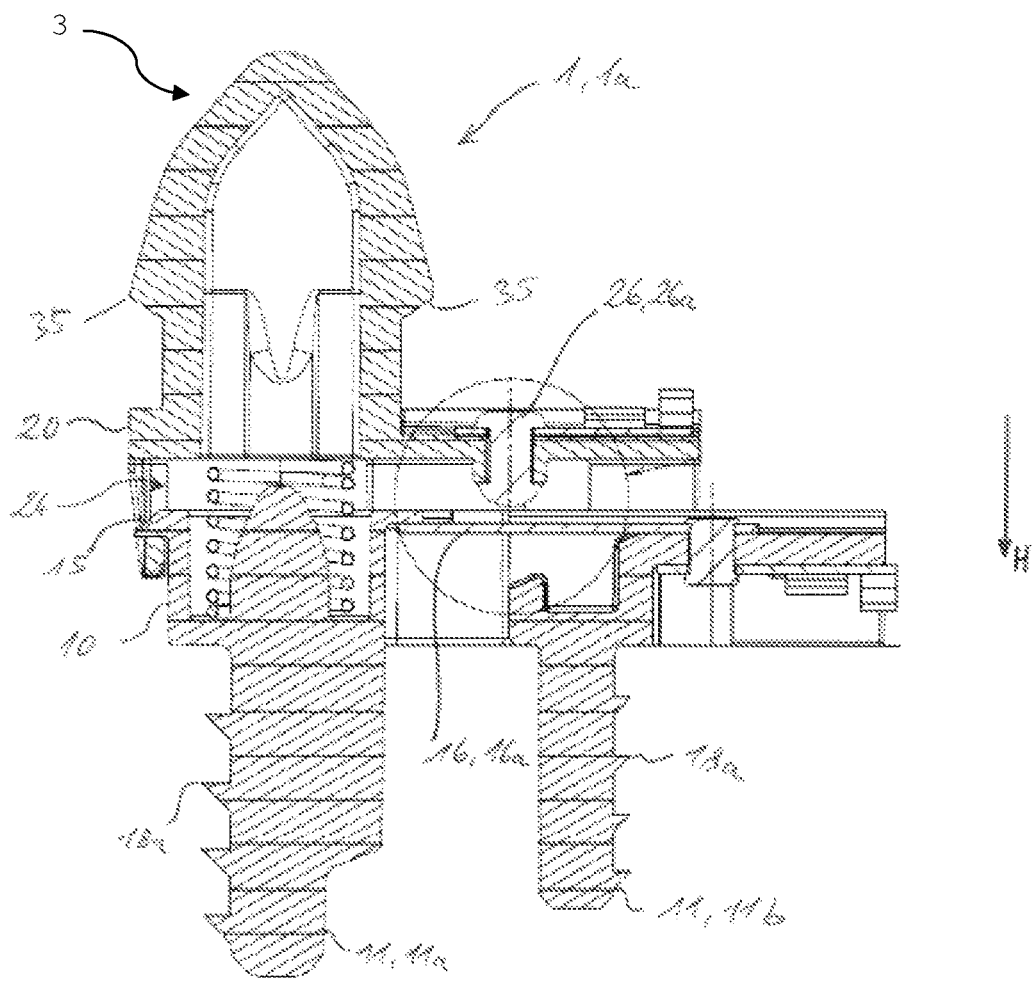
FIG. 9 shows a sectional view of a connector component according to the invention in accordance with a second preferred embodiment.
Figure 10:
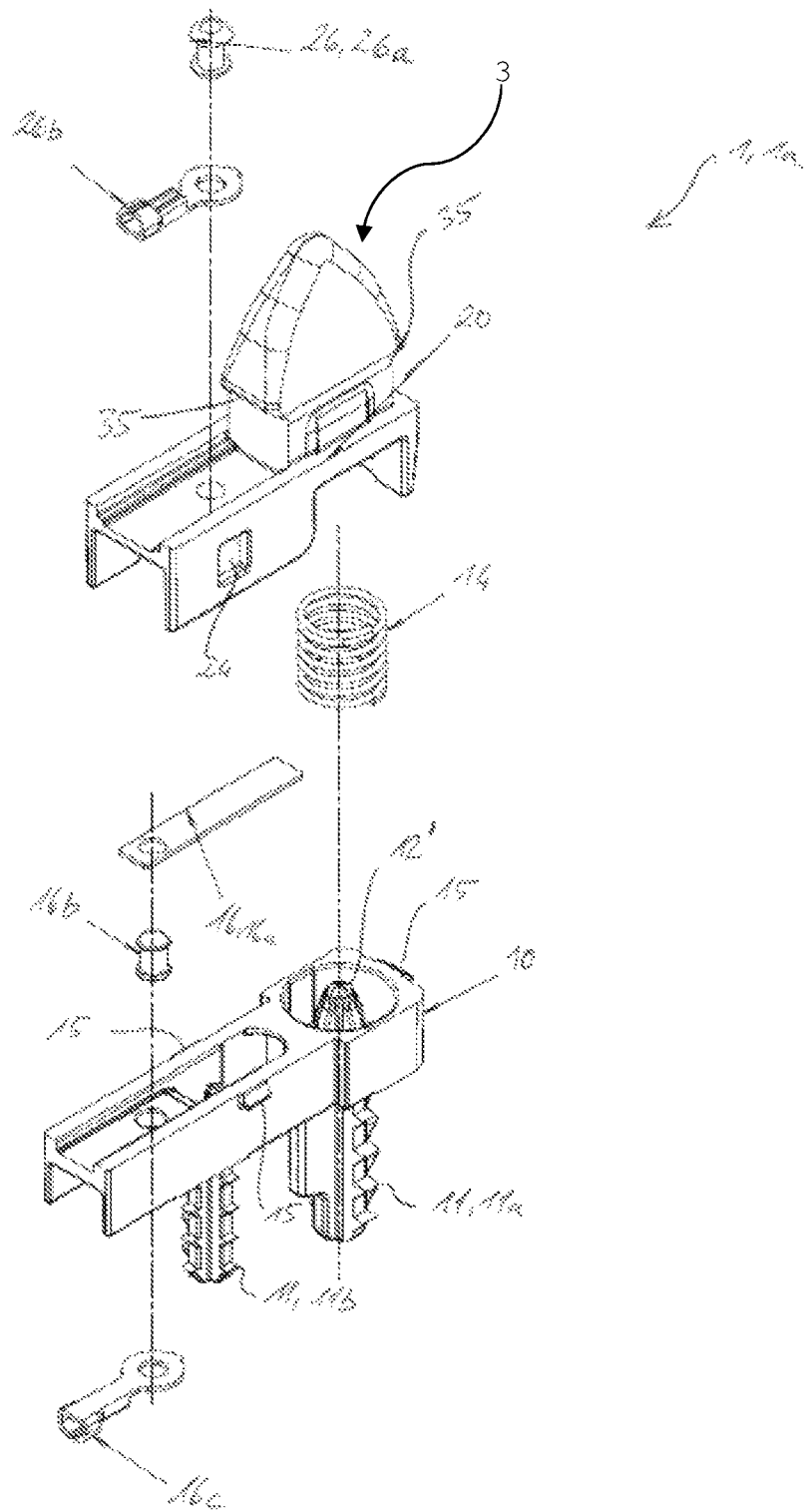
FIG. 10 shows an exploded perspective view of the connector component according to FIG. 9.

The second preferred embodiment of the invention described in the following on the basis of FIGS. 9 and 10 differs from the embodiment described above essentially in that a profile lug 3 formed integrally with the module-side part 20 of the connector component 1 is provided instead of a positioning sleeve 2 that can be snap-fit with the module-side part 20.

Figure 8:
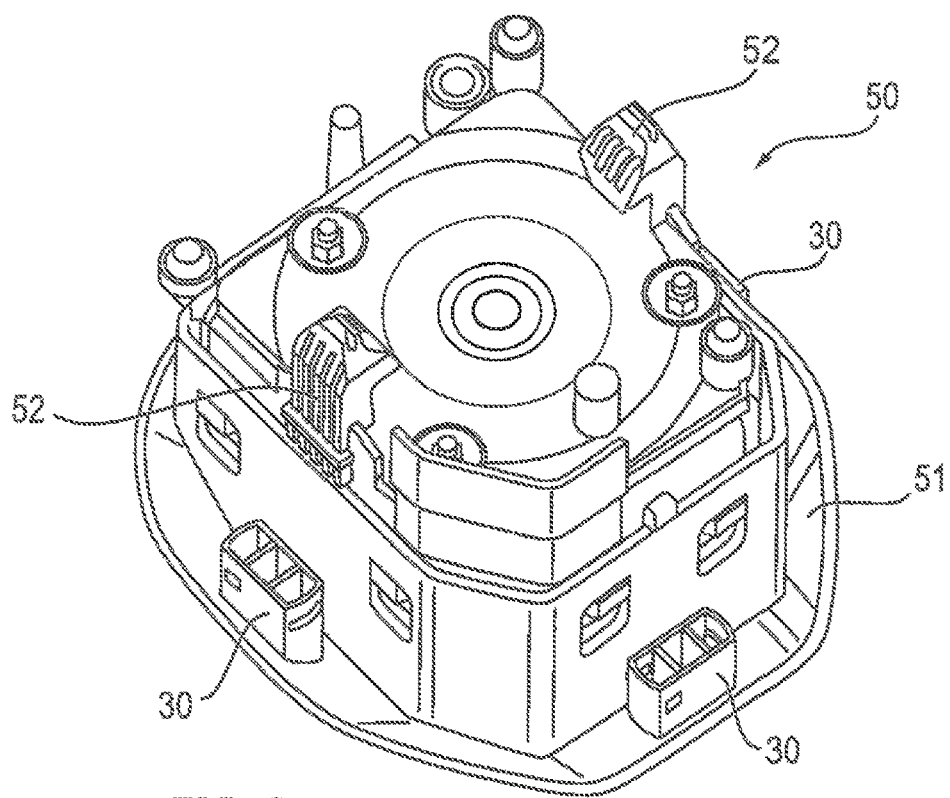
FIG. 8 shows a perspective view of an airbag module comprising the positioning sleeves according to FIG. 7.

The profile lug 3 is tapered at its free end for easy handling when inserting the profile lug 3 in a positioning sleeve 30 of the airbag module 50 (FIG. 8). In other words, the profile width and/or the profile depth of the profile lug 3 is reduced in a direction towards a free end of the profile lug 3. This facilitates the assembly of the connector component 1, 1a with the positioning sleeve 30, wherein the profile lug 3 adopts a guiding function.

Further, contrary to the first embodiment, a height of the positioning pin 12 is merely such that it can ensure a good guidance of the biasing means 14. In this case, the airbag module 50 is guided by the profile lug 3.

During assembly according to this second embodiment, the airbag module 50 being equipped with positioning sleeves 30 is fit on the steering wheel 40, wherein the joining motion between the positioning sleeve 30 and the connector component 1 is guided by the profile lug 3. By applying an appropriate pressure on the airbag module 50, projections 35 interlock with corresponding lock receptacles in the positioning sleeves 30 of the airbag module 50, such that the airbag module 50 is firmly connected to the steering wheel 40.

Since, upon locking the positioning sleeve 30 to the profile lug 3, the module-side part 20 is simultaneously pressed towards the steering wheel-side part 10 against the spring load of the biasing means 14, thus assuming the hooting position, a functional check of the horn contacts 16, 26 can already be carried out when connecting the airbag module 50 and the steering wheel 40. Thus, overall the individual steps for manufacturing steering wheel assemblies are reduced, which positively affects the series production of steering wheel assemblies.

The shape of the profile lug 3 in its longitudinal section corresponds to the section of a bent pyramid, i.e. a four-sided prism, wherein each gradient of two opposite sides is bigger in the region of a basis than in the region of a tip of the prism. Here, the tip is to be understood as a rounded upper end of the profile lug, where the sides come together. The borders or edges between the sides are also rounded.

In the shown embodiment of the profile lug 3, its cross section corresponds to the section of a "normal" pyramid; however there is also an embodiment imaginable with all four sides having a (rounded) bend and two different gradients, as described before.

As a result, especially when designed as (partly) bent pyramid, a simple assembly of the connector component 1 and the airbag module 50 has been created.

In both embodiments of the invention, it is intended that the connector component 1 includes at least one anchoring element 11 at its steering wheel-side part 10 for fixation in a steering wheel foam coating 41. In particular, associated barbed hooks 18a are provided for this fixation. According to a version shown in FIGS. 9 and 10, the anchoring element 11 includes two anchoring subelements 11a, 11b, each including barbed hooks 18a. Preferably however, the barbed hooks are merely provided at the outer faces of an anchoring subelement 11a, 11b that are not orientated towards the outer faces of the other anchoring subelement 11b, 11a, respectively.

Furthermore, it is preferably intended that the electrical contacts include a first horn contact 16 and a second horn contact 26, the first horn contact 16 being arranged at the steering wheel-side part 10 and the second horn contact 26 being arranged at the module-side part 20, wherein at least one of the two horn contacts 16, 26 is displaceable in a hooting direction H by a distance long enough to allow a snap-fit between the module-side part 20 and the steering wheel-side part 10.

In this connection, the possible distance of displacement is particularly at least 1 mm, preferably 2 mm and in particular 3 mm longer than the stretch of way required for an electrical contact between the two horn contacts 16, 26.

Further, it is also preferred that at least one of the two horn contacts 16, 26 includes a horn contact plate 16a that is displaceable or movable in the hooting direction H by this distance to guarantee a reliable locking of the respective components among each other.

Thus, for provision of a snap-fit connection movable in the hooting direction between the module-side part 20 and the steering wheel-side part 10, one of the parts 10, 20 includes snap hooks 15 and the other part 20 includes corresponding snap recesses 24.

LIST OF REFERENCE NUMERALS

1 Connector component
2 positioning sleeve
3 profile lug
10 steering wheel-side part
11 anchoring element
12 positioning pin
13 tensioning means acceptance
14 biasing means
15 snap hook
16 first horn contact
16a contact plate
16b penetration contact
16c first terminal
17 retaining extension
18 projection
19 land
20 module-side part
21 snap hook
22 penetration aperture
23 side wall
24 snap recess
25 centering plate
26 second horn contact
26a contact rivet
26b second terminal
30 positioning sleeve
31 inner chamber
32 outer chamber
33 partition wall
34 engaging aperture
40 steering wheel
41 steering wheel foam coating
42 retaining bracket
43 steering wheel armature
50 airbag module
51 cover
52 fastening hook

The invention claimed is:

1. A connector component (1) for fastening an airbag module (50) to a steering wheel (40) comprising a steering wheel-side part (10) and a module-side part (20) which are movable relative to each other and are biased against each other by a biasing means such that the module-side part (20) in an idle position is spaced apart from the steering wheel-side part (10) in a hooting direction (H) and is movable into a hooting position in which the module-side part (20) contacts the steering wheel-side part (10), the biasing means being received in a cup-shaped tensioning means seat of the steering wheel-side part, the steering wheel-side part including an anchoring element and a positioning pin, the anchoring element being adapted to fix the steering wheel-side part in the steering wheel, the positioning pin extending through the module-side part and the biasing means, the tensioning means seat, the anchoring element, and the positioning pin being coaxial with one another,
wherein the module-side part (20) and the steering wheel-side part (10) are interconnected and form a multifunctional component including a guiding device for guided movement of the module-side part (20) from the idle position into the hooting position and electric contacts for an electric horn circuit, the electric contacts contacting each other in the hooting position.

2. The connector component (1) according to claim 1, wherein the anchoring element (11) is adapted for fixation in a steering wheel foam coating (41), the anchoring element (11) including barbed hooks (18a) for said fixation, wherein the at least one anchoring element (11) includes two anchoring subelements (11a, 11b), each anchoring subelement (11a, 11b) including barbed hooks (18a).

3. The connector component (1) according to claim 1, wherein the electric contacts include a first horn contact (16) and a second horn contact (26), the first horn contact (16) being arranged at the steering wheel-side part (10) and the second horn contact (26) being arranged at the module-side part (20), at least one of the two horn contacts (16, 26) being displaceable by a distance at least long enough to allow a snap-fit between the module-side part (20) and the steering wheel-side part (10).

4. The connector component (1) according to claim 1, wherein one part of the module-side part (20) and the steering wheel-side part (10) includes snap hooks (15) and one other part of the module-side part and the steering wheel-side part includes corresponding snap recesses (24) in order to create a snap-fit connection between the module-side part (20) and the steering wheel-side part (10), the snap-fit connection being movable in the hooting direction.

5. The connector component (1) according to claim 1, wherein the positioning pin (12) is formed integrally with the steering wheel-side part (10) and wherein the positioning pin (12) has a cross profile with a profile width of the cross profile being larger than a profile depth of the cross profile.

6. The connector component (1) according to claim 1, wherein the module-side part (20) includes at least one snap hook (21) for positive fixation at the airbag module (50).

7. The connector component (1) according to claim 1, wherein the electric contacts are arranged between side walls (23) of the module-side part (20).

8. The connector component (1) according to claim 7, wherein the guiding device comprises the side walls (23) of the module-side part (20), wherein in the idle position the side walls (23) at least partially overlap or encompass the steering wheel-side part (10) so that the steering wheel-side part (10) is guided between the side walls (23).

9. The connector component (1) according to claim 1, wherein the module-side part (20) includes a profile lug (3) for positioning the connector component (1) at an airbag module (50), wherein the shape of the profile lug (3) essentially corresponds to a four-sided prism, wherein a gradient of at least two sides of the prism is bigger in the region of a basis than in the region of a tip of the prism.

10. The connector component (1) according to claim 9, wherein the other two opposite sides of the profile lug (3) have a constant gradient.

11. The connector component (1) according to claim 9, wherein a free end of the profile lug (3) remote from the module-side part (20), where the sides come together is rounded and/or borders or edges between the sides are rounded.

12. The connector component (1) according to claim 1, wherein the module-side part (20) and the steering wheel-side part (10) are connected by snap-fit, the steering wheel-side part (10) including snap hooks (15) engaging in snap recesses (24) of the module-side part (20).

13. A positioning sleeve (30, 2) adapted to be tightly connected to an airbag module (50) or adapted to be integrated in an airbag module (50) in one piece and having an inner contour which is shaped and dimensioned for engagement free from play of the positioning pin (12) or a profile lug (3) of the connector component (1) according to claim 1.

14. A set comprising a connector component (1) and a positioning sleeve (30, 2) according to claim 13.

15. A steering wheel (40) comprising a connector component (1) according to claim 1, a steering wheel armature (43) and a steering wheel foam coating (41), wherein the steering wheel-side part (10) is embedded at least partially in the steering wheel foam coating (41).

16. An airbag module (50) comprising at least two positioning sleeves (30, 2) according to claim 13.

17. A method of manufacturing a steering wheel assembly, comprising the steps of:
providing a steering wheel armature (43);
foam-coating the steering wheel armature (43) for forming a steering wheel (40) including a steering wheel foam coating (41);
fixing at least two connector components (1) according to claim 1 in the steering wheel foam coating (41);
providing an airbag module (50) including at least two positioning sleeves (2); and
connecting the positioning sleeves (2) by snap-fit to module-side parts (20) of the connector components (1) for fixing the airbag module (50) to the steering wheel (40).

18. A method for connecting a steering wheel (40) to an airbag module (50), comprising:
providing a connector component (1) comprising a steering wheel-side part (10) and a module-side part (20) which are movable relative to each other and are biased against each other by a biasing means such that the module-side part (20) in an idle position is spaced apart from the steering wheel-side part (10) in a hooting direction (H) and is movable into a hooting position in which the module-side part (20) contacts the steering wheel-side part (10), the biasing means being received in a cup-shaped tensioning means seat of the steering wheel-side part, the steering wheel-side part including an anchoring element and a positioning pin, the anchoring element fixing the steering wheel-side part in the steering wheel, the positioning pin extending through the module-side part and the biasing means, the tensioning means seat, the anchoring element, and the positioning pin being coaxial with one another
interconnecting the module-side part (20) and the steering wheel-side part (10) to form a multifunctional component including a guiding device for guided movement of the module-side part (20) from the idle position into the hooting position and electric contacts for an electric horn circuit, the electric contacts contacting each other in the hooting position, and
using the connector component (1) to connect the steering wheel (40) to the airbag module (50).

19. A steering wheel assembly comprising:
a steering wheel (40) comprising a steering wheel armature (43) and a a steering wheel foam coating (41),
a connector component (1) comprising a steering wheel-side part (10) and a module-side part (20) which are movable relative to each other and are biased against each by a biasing means other such that the module-side part (20) in an idle position is spaced apart from the steering wheel-side part (10) in a hooting direction (H) and is movable into a hooting position in which the module-side part (20) contacts the steering wheel-side part (10), the biasing means being received in a cup-shaped tensioning means seat of the steering wheel-side part, the steering wheel-side part including an anchoring element and a positioning pin, the positioning pin extending through the module-side part and the biasing means, the tensioning means seat, the anchoring element, and the positioning pin being coaxial with one another,
wherein the module-side part (20) and the steering wheel-side part (10) are interconnected and form a multifunctional component including a guiding device for guided movement of the module-side part (20) from the idle position into the hooting position and electric contacts for an electric horn circuit, the electric contacts contacting each other in the hooting position, and wherein the anchoring element (11) of the steering wheel-side part (10) is embedded at least partially in the steering wheel foam coating (41), and an airbag module (50) comprising at least one positioning sleeve (30, 2) adapted to be tightly connected to the airbag module (50) or adapted to be integrated in the airbag module (50) in one piece and having an inner contour which is shaped and dimensioned for engagement free from play of the positioning pin (12) or a profile lug (3) of the connector component (1), wherein the airbag module (50) includes at least two positioning sleeves (2), which are positively connected to at least two connector components (1) fixed to the steering wheel (40).

* * * * *